United States Patent
Huhmann et al.

(10) Patent No.: US 9,385,534 B2
(45) Date of Patent: Jul. 5, 2016

(54) ADMINISTRABLE POWER NETWORK HAVING A DATA TRANSMISSION FUNCTION

(75) Inventors: Andreas Huhmann, Espelkamp (DE); Klaus Sperlich, Roedinghausen (DE); John Witt, Detmold (DE); Volker Klanke, Stemwede (DE); Jan Drescher, Apelem (DE)

(73) Assignee: Harting Electric GmbH & Co. KG, Espelkamp (DE)

( * ) Notice: Subject to any disclaimer, the term of this patent is extended or adjusted under 35 U.S.C. 154(b) by 272 days.

(21) Appl. No.: 14/006,283

(22) PCT Filed: Mar. 22, 2012

(86) PCT No.: PCT/DE2012/100074
§ 371 (c)(1),
(2), (4) Date: Sep. 19, 2013

(87) PCT Pub. No.: WO2012/130228
PCT Pub. Date: Oct. 4, 2012

(65) Prior Publication Data
US 2014/0012425 A1    Jan. 9, 2014

(30) Foreign Application Priority Data
Mar. 28, 2011 (DE) .......... 10 2011 001 602
Mar. 30, 2011 (DE) .......... 10 2011 001 668

(51) Int. Cl.
G06F 19/00    (2011.01)
H02J 3/36    (2006.01)
H02K 19/10    (2006.01)

(52) U.S. Cl.
CPC ............. *H02J 3/36* (2013.01); *H02K 19/103* (2013.01); *H02K 2201/12* (2013.01)

(58) Field of Classification Search
CPC ......... H02J 3/36; H02J 13/0058; Y02E 60/60
USPC ............................................. 700/286
See application file for complete search history.

(56) References Cited

U.S. PATENT DOCUMENTS

| 5,329,464 A | * | 7/1994 | Sumic ................ G06T 17/05 700/286 |
| 7,058,482 B2 | | 6/2006 | Fletcher et al. ........... 700/292 |

(Continued)

FOREIGN PATENT DOCUMENTS

| DE | 101 55 189 | 7/2003 | ......... H04L 12/10 |
| DE | 102 32 303 | 2/2004 | ......... H04B 3/54 |

(Continued)

OTHER PUBLICATIONS

International Search Report issued in corresponding PCT Patent Appln. No. PCT/DE2012/100074 dated Oct. 2, 2012 with English translation (12 pgs).

(Continued)

*Primary Examiner* — Michael D Masinick
(74) *Attorney, Agent, or Firm* — Hayes Soloway, P.C.

(57) ABSTRACT

A power network having special junction boxes and an associated method for operation and evaluation which makes it possible, after construction and wiring, to recognise and to simulate the topology of the power distribution automatically is provided. On this basis the current consumption can then be determined in certain branches, for example also in a tree or ring network structure. In particular, deviations from the desired value, for example a disproportionately high current consumption, can be recognised and localised, so that as a consequence certain load and/or entire power network segments can be switched on and off. For analysis, the corresponding values of relevant electrical variables can be continuously observed, stored in a database, held for any period of time and displayed graphically. Connection errors, wire breakage and overload and undervoltage can be recognised and eliminated by analysing the values of the respective electrical variables.

19 Claims, 10 Drawing Sheets

(56) References Cited

U.S. PATENT DOCUMENTS

| | | | |
|---|---|---|---|
| 7,231,283 B2 | 6/2007 | Maier | 700/291 |
| 7,631,204 B2 | 12/2009 | Hublitz et al. | 713/310 |
| 8,374,727 B2* | 2/2013 | Wimmer | H02H 7/261 |
| | | | 307/4 |
| 8,447,434 B1* | 5/2013 | Harris | H02J 3/36 |
| | | | 700/19 |
| 8,504,214 B2* | 8/2013 | Genc | G05B 23/0248 |
| | | | 700/286 |
| 8,606,372 B1* | 12/2013 | Harris | H02J 3/00 |
| | | | 700/20 |
| 9,191,304 B1* | 11/2015 | Plate | H04L 45/08 |
| 2004/0030859 A1* | 2/2004 | Doerr | G06F 15/8023 |
| | | | 712/15 |
| 2004/0081462 A1* | 4/2004 | Sarah | H04J 14/08 |
| | | | 398/42 |
| 2004/0111496 A1 | 6/2004 | Han et al. | 709/220 |
| 2005/0018857 A1 | 1/2005 | McCarty et al. | 381/58 |
| 2005/0069028 A1 | 3/2005 | Belge et al. | 375/222 |
| 2006/0152344 A1 | 7/2006 | Mowery, Jr. | 340/310.11 |
| 2007/0091925 A1 | 4/2007 | Miyazaki et al. | |
| 2009/0189774 A1 | 7/2009 | Brundridge et al. | |
| 2009/0251127 A1 | 10/2009 | Kim | |
| 2012/0062139 A1 | 3/2012 | Ruether et al. | |
| 2012/0158933 A1* | 6/2012 | Shetty | H04L 41/0893 |
| | | | 709/223 |
| 2014/0012425 A1* | 1/2014 | Huhmann | H02K 19/103 |
| | | | 700/286 |
| 2014/0368189 A1* | 12/2014 | Bernheim | G01R 22/066 |
| | | | 324/115 |

FOREIGN PATENT DOCUMENTS

| | | | | |
|---|---|---|---|---|
| DE | 10 2004 021 380 | | 12/2005 | H02J 4/00 |
| DE | 102004021380 A1 | | 12/2005 | |
| EP | 2 194 656 | | 12/2008 | H04B 3/54 |
| WO | WO 03/094765 | | 11/2003 | A61B 18/14 |
| WO | WO 2006/126160 | | 11/2006 | |
| WO | 2007032548 A1 | | 3/2007 | |
| WO | WO 2009/127817 | | 10/2009 | H02H 7/26 |
| WO | 2010088886 A1 | | 8/2010 | |
| WO | 2011025934 A2 | | 3/2011 | |

OTHER PUBLICATIONS

Written Opinion issued in corresponding PCT Patent Appln. No. PCT/DE2012/100074 dated Sep. 28, 2013 (10 pgs).

Written Opinion issued in corresponding PCT Patent Appln. No. PCT/DE2012/100074 dated May 5, 2013.

International Preliminary Report on Patentability issued in corresponding application No. PCT/DE2012/100074, dated Nov. 14, 2013 (6 pgs).

* cited by examiner

ADMINISTRABLE POWER NETWORK HAVING A DATA TRANSMISSION FUNCTION

The invention relates to an energy grid with a data transmission function for distributing electrical energy in the industrial sector.

Furthermore, the invention relates to a connection box.

In a further aspect, the invention relates to a method for operating the energy grid.

Furthermore, the invention relates to a method for measuring, evaluating, performing diagnostics on and administrating the energy grid.

Such energy grids are used for distributing electrical energy in the industrial sector, for example in the sector of automated assembly lines.

PRIOR ART

It is known from the prior art, for example from document DE10232303A1, to modulate digital data onto a supply voltage and to transmit both the data and the supply voltage together over an electrical energy distribution grid.

Document DE102004021380A1 discloses a power supply apparatus which has a plurality of power supply components. The power supply components are each provided with a communications interface and are connected via this communications interface and a communications channel to a common analysis and control unit. The analysis and control unit controls a load management system for the power supply components.

Document DE10155189A1 discloses a method for regulating the power supply to a plurality of field devices which are connected via a data bus line and are supplied with power via the data bus line. In this case, the current demand of the individual field devices is determined and the current consumption of the field devices is adjusted by means of corresponding control signals. As a result, the current consumption of individual field devices can be adjusted centrally and therefore can be matched to the process conditions.

Document U.S. Pat. No. 7,058,482B2 discloses a data sample and transmission module for an energy distribution system. The module has a microprocessor and a network connection. The microprocessor takes one or more first signals as an indication of the nature of the energy in the energy distribution system. The microprocessor is in communication with a data network by means of the network interface.

Document WO2009127817A1 describes a self-organizing energy distribution network for large areas. Said document discloses connecting a communications network in parallel with the energy distribution network and determining at least some of the topography via switches and measuring devices, wherein the energy distribution network is divided into zones, which can then be shut down independently of one another.

One disadvantage in the prior art consists in that the complexity involved in the diagnostic analysis and administration of energy grids is very high for the industrial sector, for example for the manufacturing sector. For example, the investigation into which area will require how much energy at a specific point in time is very complex. In association with this, it is also extremely difficult to shut down superfluous loads in cost-optimizing fashion in the case of a particularly high total energy consumption.

Object

The object of the present invention therefore consists in simplifying the administratability of and the ability to perform diagnostics on an energy grid of the type mentioned at the outset with as little installation complexity as possible.

This object is achieved in that the energy grid comprises a computer unit and a plurality of connection boxes, wherein the computer unit has software and at least one computer data network connection, wherein each connection box has at least three energy connections, which are electrically conductively connected to one another via a branching internal energy line within the connection box, and at least one, preferably two box data network connections, wherein the computer unit is connected, via its computer data network connection, to a data network, and wherein at least one of the connection boxes is connected, via one of its box data network connections, to the data network and therefore is in data interchange with the computer unit via the data network, wherein at least one of the connection boxes is connected with one of its energy connections, via an energy cable, directly to an external electrical energy supply device, wherein each connection box is connected, with at least one of its energy connections, via in each case one energy cable, to one of the energy connections of at least one connection box directly adjacent thereto, so that each of the connection boxes is connected directly or via the electrical energy connections of one or a plurality of other connection boxes to the external energy supply device, wherein each connection box is in bidirectional data interchange with the at least one connection box directly adjacent thereto via the energy cable connecting these two connection boxes.

Here and in the text which follows, two connection boxes are referred to as being directly adjacent when they are each connected directly to one another with one of their energy connections via an energy cable.

Furthermore, the term computer data network connection denotes a data network connection of the computer unit and the term box data network connection denotes a data network connection of the respective connection box which is compatible with the data network connection of the computer unit.

This object is furthermore achieved by a connection box which has the following:

at least three electrical energy connections, which are electrically conductively connected to one another via a branching internal energy line and which are each suitable both for connection to another connection box and for connection to an external load and for connection to an external electrical energy supply device;

for each energy connection, a modulation/demodulation device, which is connected thereto and which is suitable for modulating data onto a supply voltage present at the energy connection;

a data network switch, which is connected to the modulation/demodulation devices for data transmission and has a microprocessor and at least one, preferably two external box data network connections;

at least one measurement means assembly, which is connected to the data network switch, having means for detecting the values of electrical variables at at least two different measurement points in different branches of the internal energy line.

A "data network switch" is in this case understood to mean a data device with at least three data connections ("ports"), which receives data and, in accordance with certain criteria, passes these data on to some of these ports or retains these data. In particular, a data network switch has more than three ports and passes on various data received by it via a port to one or more of the other ports. Furthermore, a data network switch can have a processor, with which it can also process the data.

The term "electrical variables" is understood here and in the text which follows to mean, for example, current and voltage and also variables to be determined therefrom, such as power, for example.

Correspondingly, the term "means for detecting the values of electrical variables at at least two different measurement points" includes ammeters and voltmeters and the associated measurement lines. Furthermore, an arithmetic logic unit can also be included among these means since values such as rms values and/or power or active power can be determined from the measured variables current and voltage by said arithmetic logic unit.

The object is furthermore achieved by a method for operating the energy grid, wherein the method comprises topology identification, wherein the topology identification has the following steps:

sequential interrogation of the connection boxes by the computer unit;

implementation of direct neighbor identification between each connection box and the at least one connection box directly adjacent thereto, wherein the direct neighbor identification is performed by the bidirectional data transmission between each connection box and the at least one connection box directly adjacent thereto via the energy cable connecting these two connecting boxes;

transmission of the direct neighbor relationships of the connection boxes to the computer unit;

imaging of the topology of the energy grid corresponding to the direct neighbor relationships transmitted by the computer unit.

Here, the term "direct neighbor identification" means that a connection box is identified with respect to the connection box directly adjacent thereto, for example by virtue of the connection box transmitting its IP address, the MAC address of its data network switch and/or an individual identification to the at least one connection box directly adjacent thereto.

The term "topology" should be understood here and in the text which follows to mean the grid structure of the energy distribution. The topology therefore describes the layout of the energy connections between the connection boxes which is implemented via the connection of the energy cables. The term "topology identification" should correspondingly be understood to mean the identification of the layout of the energy connections between the connection boxes, i.e. the wiring of said connection boxes via energy cables.

The object is furthermore achieved by a method for measuring, evaluating, performing diagnostics on and administrating the energy grid, wherein the method comprises the following steps:

determination of the values of electrical variables by the individual connection boxes at their energy connections;

interrogation of the values of the electrical variables of the individual connection boxes by the computer unit;

transmission of the values of the electrical variables from the connection boxes to the computer unit;

storage of the values of the electrical variables as belonging to the respective connection boxes in a database of the computer unit;

regular calculation of the energy consumption at the individual connection boxes by the computer unit;

regular calculation of the total energy consumption by the computer

Advantageous configurations of the invention are specified in the dependent subclaims.

The invention relates to an energy grid with special connection boxes and an associated operating and evaluation method, which makes it possible to automatically identify and reproduce the topology of the energy distribution in terms of construction and wiring. On this basis, the current consumption can thereupon be determined in specific branches, for example also in the case of a tree-shaped or ring-shaped grid structure. In particular, discrepancies with respect to the setpoint value, for example a disproportionately high current consumption, can be identified and localized, with the result that consequently determined loads and/or entire energy network segments can be connected and disconnected. For the analysis, the corresponding values of relevant electrical variables can be observed continuously, stored in a database, held for any desired period and represented graphically. Connection faults, wire breakage and overload as well as undervoltage can be identified by the analysis of the values of the respective electrical variables and eliminated.

For the direct neighbor identification, it is particularly advantageous to transmit at least the identification of a connection box with respect to the at least one connection box directly adjacent thereto over the energy cable connecting these two connection boxes because, as a result, the topology of the energy grid can be imaged automatically. It is advantageous here to ensure, by virtue of the use of electrical filters in the connection boxes which can be arranged in particular in the modulation/demodulation devices, that the data used for the identification are interchanged exclusively between the two connection boxes involved, namely one connection box and one connection box directly adjacent thereto, because this enables direct neighbor identification. In particular, this filter is a low-pass filter, preferably an inductance which is connected in series with the internal energy line and which is connected on the box side to ground via a capacitance.

The data network switch is particularly advantageous because, owing to its connection to the modulation/demodulation devices, it is capable of transmitting data from one energy connection of its connection box to another energy connection of its connection box. Thus, despite the electrical filter, data can also be transmitted via a plurality of connection boxes via the energy cables connecting said connection boxes up to the computer unit, for example.

Thus, a point-to-point data link is set up between in each case two connection boxes via the energy cables. By virtue of a large number of such point-to-point data links, certain data, if desired, can also be transmitted over the entire energy grid. At the same time, an electrically conductive energy connection between all of the connection boxes involved is also realized via the energy cables.

It is particularly advantageous that the data network switch of the connection boxes has in each case at least one, preferably two external box data network connections, as a result of which barely any additional costs arise. As a result, said data network switch can also transmit data over the substantially faster data network in addition to or as an alternative to the data transmission over the energy cables.

In principle, the data network can have any desired design. In particular, however, a linear structure is recommended, firstly because this keeps the wiring complexity low and secondly because each connection box as a result only requires two data network connections. For a star point structure, it is necessary for either a plurality of connection boxes, preferably all of the connection boxes for compatibility reasons, or the computer unit to each have more than two data network connections or for the energy grid to comprise at least one further component part which has more than two data network connections.

It is particularly advantageous if that connection box which is connected directly to the external electrical energy supply with one of its energy connections via an energy cable is connected to the respective energy connection of two connection boxes directly adjacent thereto via two further ones of its energy connections via in each case one further energy cable because, as a result, a ring structure or a tree structure is enabled in the energy distribution. This is advantageous because, by sensibly combining a plurality of loads in one branch of the energy distribution, these loads can be administrated jointly and in particular the energy supply to said loads can be connected and disconnected.

In order to produce a ring or tree structure, it is furthermore advantageous if at least one of those connection boxes which are not connected directly to the external electrical energy supply is connected, with at least three of its energy connections, to in each case at least three connection boxes directly adjacent thereto. This is advantageous because this enables a tree structure, wherein by sensibly combining a plurality of loads in one branch, these loads can be administrated and in particular switched on and off jointly.

Preferably, the connection boxes can have precisely three energy connections. Then, optionally three connection boxes directly adjacent to one connection box or else two connection boxes directly adjacent to this connection box and a load can be connected to this connection box.

In a further advantageous configuration, at least one connection box is connected, with one of its energy connections, to an external load via one of the energy cables. This is advantageous because this ensures the Power supply to the load.

It is advantageous in this context to connect the load to the energy connection of the connection box in question via an electrically actuable switching device, which is also known as an electrically actuable switching element. The electrically actuable switching device can be a circuit breaker, a semiconductor switching device, a relay, a contactor, a motor protection relay or motor circuit breaker and a line circuit breaker. The connection box can have one or more external switching connections. The switching device can be connected to one of these switching connections via a switching line. These switching connections can belong to the data network switch or are at least connected thereto.

Also, the switching device can be an integral part of the connection box. Correspondingly, the connection box can also have one or more internal switching connections, and the switching device can be connected to one of these internal switching connections and switched thereby, wherein the internal switching connections belong to the data network switch or are at least connected thereto.

It is furthermore advantageous if the energy cables are three-phase cables, the energy connections are three-phase connections and the box-internal, branching energy line is a three-phase line because, as a result, corresponding loads which require three-phase current can be connected to the energy grid and supplied with energy thereby. Correspondingly, the modulation/demodulation device can be connected to only one phase of the three-phase line. The modulation/demodulation device can also be connected to two phases of the three-phase line, however, as a result of which symmetrical data transmission is enabled.

It is furthermore advantageous if the energy grid is a DC grid or AC grid because, as a result, corresponding loads which require direct current or alternating current can be connected to the energy grid and supplied with energy thereby.

It is furthermore advantageous if the connection box, in particular the modulation/demodulation device of the connection box, has electrical filters, which are suitable for preventing the transmission of the data modulated at the associated energy connection to the other electrical energy connections of this connection box via the box-internal energy line. In particular, this is a low-pass filter, in particular an inductance which is connected in series with the energy connection and which, in a preferred embodiment, is connected on the box side to ground via a capacitance.

If, as described above, the energy cables are three-phase cables, the energy connections are three-phase connections and the box-internal, branching energy line is a three-phase line and the modulation/demodulation devices are connected to only one phase or to two phases of the three-phase line, the electrical filters also only need to be connected to these one or two phases.

It is furthermore particularly advantageous that the connection box has in each case at least one, preferably two box data network connections because the cable-based design of the data network can therefore deviate from the design of the energy grid. In this case, already existing and possibly already permanently laid energy cables and/or data cables in a production hall can be used, for example.

In this case, the connection boxes can also be connected to an already existing data network, for example an Ethernet.

Secondly, it is also advantageous if a common data network provided exclusively for this is set up exclusively via the computer data network connection and the box data network connections because then no additional or already existing data network is required. In this case, a first connection box can be connected with one of its box data network connections, via a first data cable, to the computer data network connection of the computer unit. The first connection box is connected, with a further box data network connection, to one of the box data network connections of a second connection box, which is in turn connected via a data cable to a third connection box, and this third connection box to a fourth connection box, etc.

In a preferred embodiment, finally each of the connection boxes is connected to the data network. In particular, each connection box is connected with at least one of its box data network connections to the box data network connection of at least one other connection box, with the result that each connection box is connected with one of its box data network connections directly or indirectly, i.e. via one or more other connection boxes, to the computer data network connection of the computer unit and is therefore in data interchange with this computer unit via the data network thus formed. For this it is advantageous if each connection box has two box data network connections in series. The last connection box in the chain actually only requires one box data network connection, but has advantageously likewise two box data network connections for compatibility reasons. This has the advantage that all of the connection boxes within the energy grid are universally usable.

In a further preferred embodiment, only the first connection box is connected to the network, i.e. directly to the computer unit. All further connection boxes transmit their data via the energy cable. Thus, the first connection box performs the function of a gateway.

In a preferred embodiment, individual components of the connection boxes, in particular the data network switches thereof, can also remain in operation when the energy cables are not conducting any supply voltage. For this purpose, it is particularly advantageous if the data network provides a corresponding power supply via the data cables. An external power supply for the connection boxes is also conceivable, which comprises a corresponding supply line which can be laid, for example, together with the data cables to the connection boxes. The external power supply can comprise an external low-voltage switched-mode power supply, in particular a 24 V switched-mode power supply, which for its part is fed from a separate current source, wherein this further current source can be isolated from the energy supply device such that it is in operation even when the energy supply device is disconnected.

In a further preferred embodiment, provision is made for the connection boxes to transmit actively corresponding data, in particular messages provided for this purpose, preferably warning indications, to the computer unit in the event of the onset of certain events, for example on measurement of a particularly extraordinary value for an electrical variable.

In another advantageous embodiment, the connection boxes each have a dedicated low-voltage switched-mode power supply, preferably a 24 V switched-mode power supply, for supplying power to its internal components, for example the measurement means assembly, the data network switch and the modulation/demodulation device. This switched-mode power supply can draw its supply voltage from one of the energy connections of the connection box. The connection box can also have external connections of this low-voltage switched-mode power supply, by means of which the low-voltage switched-mode power supply is provided both for supplying power to external low-voltage loads to be connected and for operating an external electrically actuable switching device.

In a preferred embodiment, the data network fulfills the Ethernet standard.

In a further embodiment, the data network uses wireless transmission methods. In particular, the data network can be a WLAN network. Correspondingly, the box data network connections of each connection box can be replaced or supplemented by a WLAN interface.

In a further embodiment, the data transmission via the energy cables can adhere to corresponding known standards, for example to the Powerline standard.

In a further embodiment, the energy cables are so-called "hybrid cables", which are characterized by the fact that they have both corresponding energy lines and also corresponding integrated data lines.

In a further preferred design, the energy grid additionally has one or more so-called "repeaters" for amplifying the data signals, which repeaters are designed in a similar manner to a connection box and are connected to the energy grid, but are formed with only two electrical energy connections.

It is particularly advantageous if the connection box has a measurement means assembly. The measurement means assembly is provided for determining electrical variables such as current, voltage and power, for example. In particular, this measurement means assembly can have an arithmetic logic unit, by means of which it is suitable for calculating the active power and the rms values of the voltage and the current at the energy connections of the connection box. For this purpose, measurement points are provided in a plurality of branches of the energy line, said measurement points being electrically conductively connected to the measurement means assembly via measurement lines. If the energy line has a number n of branches, precisely n−1 measurement points can be provided. The measurement means assembly can calculate, by means of its arithmetic logic unit, the electrical variables in the remaining branch which does not have a measurement point.

Furthermore, the measurement means assembly can, using its arithmetic logic unit, calculate the active power and the rms values of the voltage and current from the measured values. This is particularly advantageous for keeping the data rate during transmission of these electrical variables to the computer unit low.

If the box-internal, branching energy line is a three-phase line, it is advantageous if each measurement point has three subordinate measurement points, which are arranged in the three different phases of the energy line because the electrical variables of each phase can thus be determined.

Furthermore, it is advantageous if the connection box has, at least one energy connection, an electrical fuse or at least one connection for an electrical fuse or a corresponding electromechanical switch since, as a result, it is possible to fuse different energy cables differently or to isolate different energy cables by disconnection in order to be able to use energy cables with smaller cross sections in the individual branches of a tree structure, for example, than in the main distribution.

In an advantageous development, the connection box has a memory unit, in which it can store, inter alia, the values determined by said connection box for the electrical variables. Furthermore, the memory can also store the setpoint values for the electrical variables. This has the advantage that this connection box can also be used as an autonomous unit without further connection boxes and/or without a computer unit. As a result, in the event of a network fault, the determination of electrical variables can be continued. The corresponding data can then be transmitted to the computer unit to be connected thereto for this purpose, for example at a later point in time for evaluation. It is thus also possible for a group of connection boxes to be operated without a computer unit. Then, the energy grid consists of connection boxes which are connected to one another via energy cables and preferably also via data cables. One of the connection boxes, for example the first connection box, can in this case perform an administrative function and thus can temporarily or permanently replace the computer unit. For reasons of compatibility, any connection box can be suitable for performing this function.

The method for operating the energy grid comprises topology identification. This topology identification comprises direct neighbor identification between connection boxes which are directly adjacent to one another. As a result, the individual connection boxes acquire information on the identity of the at least one connection box directly adjacent thereto. This information is transmitted to the computer unit at the request of the computer unit together with the dedicated identity of the respective connection box via the energy cables and/or via the data network. On the basis of this information which the computer unit preferably acquires from all of the connection boxes, the computer unit images the topology of the energy grid with a sorting algorithm contained in its software. In this case, the transmission of redundant data is accepted. As an alternative to this, the connection boxes which are directly adjacent to one another can negotiate between themselves which of them will transmit their common neighbor relationship to the computer unit. As a result, transmission capacities can be saved.

Advantageously, the topology identification is repeated regularly, i.e. at regular time intervals, for example at time intervals of less than 10 seconds, in particular less than 5 seconds, particularly preferably 3 seconds, wherein, after each topology identification, each connection box checks its connection to the data network, whereupon either the data to be transmitted to maintain the basic functions of the energy grid are transmitted via the respective energy connections and the corresponding energy cables when the data network is not connected or the data to be transmitted for maintaining basic functions of the energy grid are preferably transmitted via the data network when the data network is connected.

In this case, the topology identification is one of the basic functions of the energy grid. Furthermore, transmission of the values of electrical variables such as current, voltage and power from individual connection boxes to the computer unit also takes place and can likewise be one of the basic functions of the energy grid. It is particularly advantageous to determine the rms values of specific electrical variables, in particular current and voltage, and the active power for each electrical connection in the connection box itself, in particular in the measurement means assembly, and to transmit these values to the computer unit because this saves on transmission capacities.

If only some connection boxes are connected to the data network, but other connection boxes are not connected to the data network, data can be transmitted, for example, between some connection boxes via data cables and between other connection boxes via energy cables.

In an advantageous configuration, when the data cable is connected, further data are also transmitted via the data network, for example data with a comparatively high data capacity, for example video data from a surveillance camera or automation data for connected loads.

In the computer unit, in addition to the topology information, each connection box in the computer unit can be uniquely denoted by a name. Advantageously, this denoted name can give an indication of a load which is connected to the connection box.

Thus, the computer unit can assign the name of each connection box to a MAC address of the data network switch of this connection box and store it in a database belonging to the computer unit. It is furthermore advantageous if the computer unit assigns the values of the electrical variables of each connection box to the respective name of this connection box and therefore to the MAC address thereof. This has the advantage that the system can also continue to assign the already stored data to the associated connection box even after a shutdown, a rundown or a system crash.

It is furthermore advantageous that, with this system, changes to the topology can be identified by renewed topology identification and a comparison between the newly imaged topology and the stored topology. Correspondingly, a warning indication can be provided which contains not only the information that the topology has changed, but also the point at which this change has occurred and what type of change this is.

In this context, it is particularly advantageous if the energy grid has a ring structure, i.e. an energy connection of a connection box is connected to a further energy connection of the same connection box indirectly via a plurality of other connection boxes. As a result, a single fault in the ring structure of the energy wiring does not immediately come to bear because the energy distribution has an alternative path, but can be identified by the direct neighbor identification and correspondingly eliminated before a second fault potentially occurs in the ring structure. This applies particularly to DC and AC grids because these have only one current-conducting core on which the data are also transmitted.

In order to measure, evaluate, perform diagnostics on and administrate the energy grid, it is particularly advantageous to implement regular calculation of the energy consumption at the individual connection boxes by means of the computer unit and regular calculation of the total energy consumption by means of the computer unit because, in this way, it is possible not only to estimate the costs of the total energy consumption but also to analyze to which load a particularly high energy consumption may be attributable or in which energy branch there is a particularly high energy consumption.

Furthermore, superfluous loads can be defined and disconnected as soon as the total energy exceeds a reference value to be fixed.

Furthermore, it is also possible to fix individual reference values for individual connection boxes, and when these individual reference values are exceeded, for a display, a signal or an alarm to be triggered, for example.

It is particularly advantageous to compare the voltage at two electrical energy connections, which are connected to one another via an energy cable, of two connection boxes which are directly adjacent to one another. If this voltage difference exceeds a specific value, this is regarded as being a clear indication of a connection fault, for example of a particularly high contact resistance, a defective or missing cable. Thereupon, a corresponding visual or acoustic warning signal, a corresponding display on a monitor of the computer or a comparable alarm can be triggered, with the result that the fault can be eliminated quickly or even identified so early it is eliminated even before it has actually occurred, for example when an energy cable becomes loose in its holder in an undesirable manner.

EXEMPLARY EMBODIMENT

An exemplary embodiment of the invention is illustrated in the drawing and will be explained in more detail below. In the drawing.

Figure 1A:
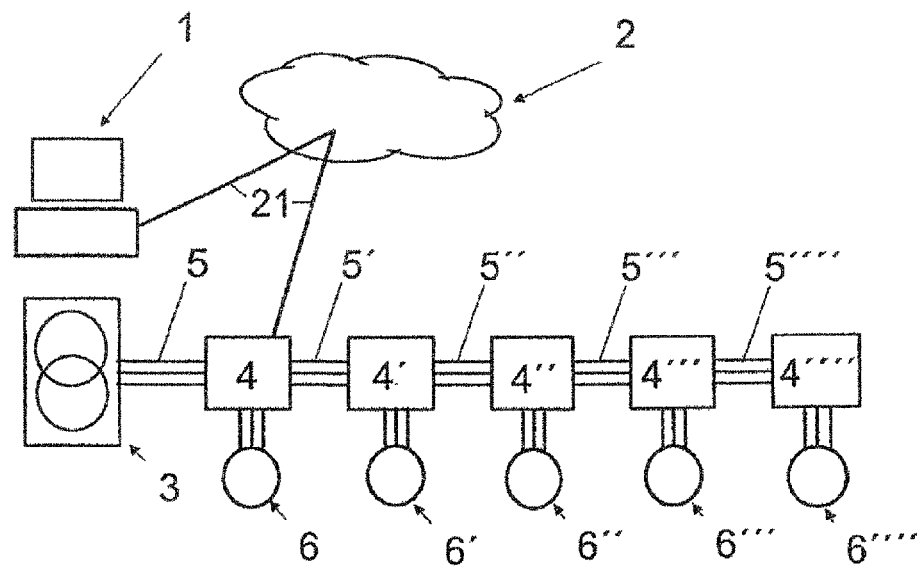
FIG. 1a shows a linear energy grid with a minimally connected data network.
Figure 1B:
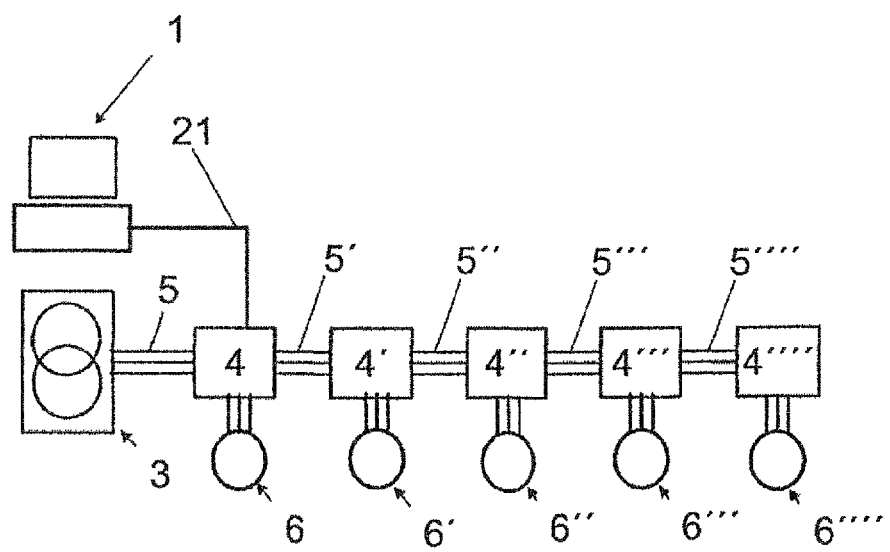
FIG. 1b shows the linear energy grid with wiring of the minimally connected data network.

FIG. 1a illustrates a linear energy grid with an associated first data network 2. FIG. 1b also illustrates explicitly the data network 2 with possible, suitable wiring. This wiring is exclusively a single data cable 21, with which a first connection box is connected to a computer unit 1. This first connection box 4 performs the function of a gateway with respect to the further energy grid.

The topology is this energy grid results from the following wiring via the energy cables 5, 5', 5", 5''', 5'''';

The first connection box 4 is connected to an external energy supply device 3 via a first energy cable 5. In addition, the first connection box 4 is connected to a second connection box 4' via a second energy cable 5'. The second connection box 4' is connected to the third connection box 4" by a third energy cable 5", which third connection box for its part is connected to the fourth connection box 4'" by a fourth energy cable 5'". The fourth connection box 4'" is finally connected to the fifth connection box 4"" by a fifth energy cable 5"", which fifth connection box is located at the end of the chain and is therefore not connected to a further connection box. Each of the connection boxes is additionally connected to in each case one load 6, 6', 6", 6'", 6"" by in each case one further energy cable (not denoted).

This results in the following direct neighbor relationships:

The first connection box 4 has the second connection box 4' as direct neighbor. The second connection box 4' has the first connection box 4 and the third connection box 4" as direct neighbors. The third connection box 4" has the second connection box 4' and the fourth connection box 4'" as direct neighbors. The fourth connection box 4"° has the third connection box 4" and the fifth connection box 4"" as direct neighbors. The fifth connection box 4"" has the fourth connection box 4'" as direct neighbor.

Figure 2A:
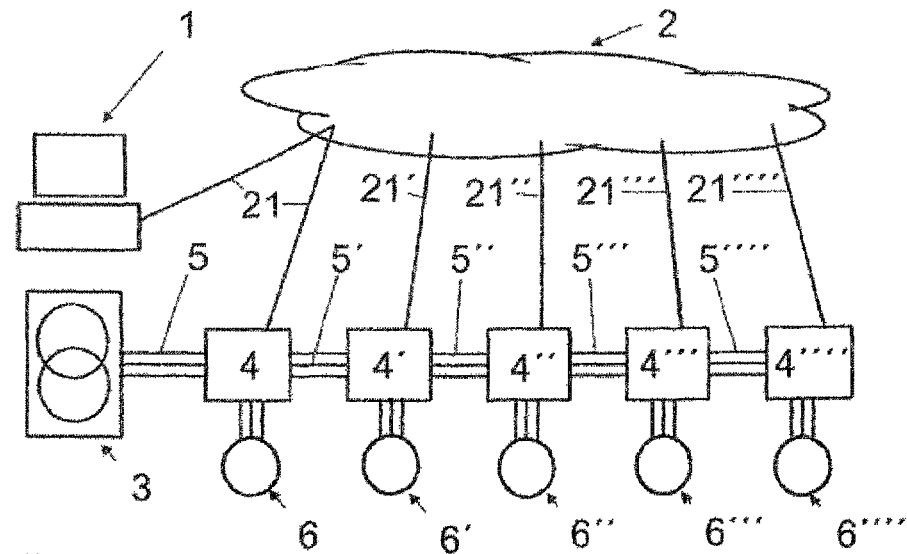
FIG. 2a shows the linear energy grid with a completely connected data network.

FIG. 2a illustrates, in the same way, the abovementioned linear energy grid, i.e. with the same topology as in the previous example, but not only the first connection box 4 but all of the connection boxes 4, 4', 4", 4'", 4"" are connected to the data network 2 via the corresponding data cables 21, 21', 21", 21'", 21"".

Figure 2B:
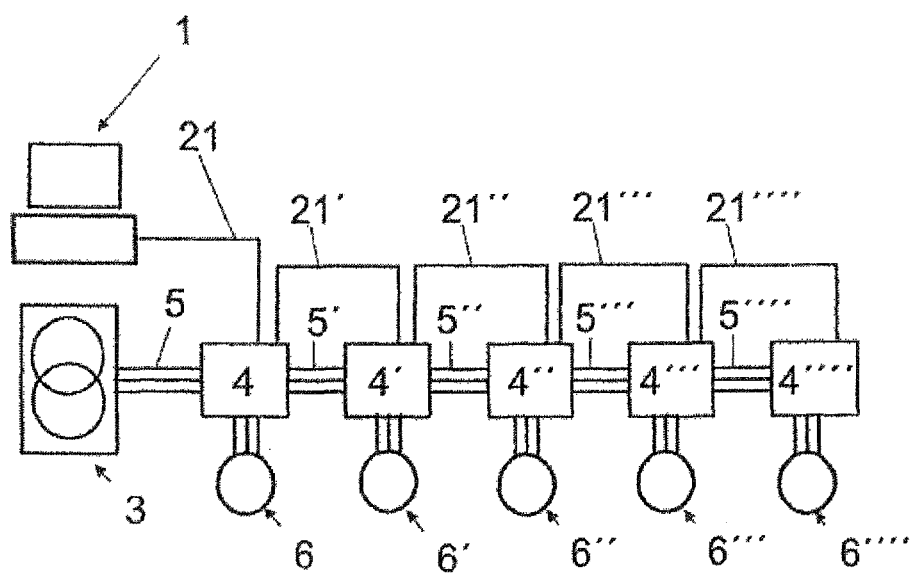
FIG. 2b shows the linear energy grid with wiring of the completely connected data network.

FIG. 2b explicitly illustrates a possible wiring suitable for this purpose of the data network 2. In this case, the first connection box 4 is connected not only to the computer unit 1 by the first data cable 21 but also to the second connection box 4' by a second data cable 21'. The second connection box 4' is connected to the third connection box 4" by a third data cable 21", which third connection box for its part is connected to the fourth connection box 4'" by a fourth data cable 21'". The fourth connection box 4'" is finally connected to the fifth connection box 4"", which represents the end of this chain and is therefore not connected to a further connection box.

The topology of this energy grid results from the following wiring via the energy cables 5, 5', 5", 5'", 5"".

The first connection box 4 is connected to the external energy supply device 3 via the first energy cable 5. In addition, the first connection box 4 is connected to the second connection box 4' via the second energy cable 5'. The second connection box 4' is connected to the third connection box 4' ' by the third energy cable 5", which third connection box for its part is connected to the fourth connection box 4'" by the fourth energy cable 5'". The fourth connection box 4'" is finally connected to the fifth connection box 4"" by the fifth energy cable 5"", which fifth connection box is located at the end of the chain and is therefore not connected to a further connection box. Each of the connection boxes is additionally connected to in each case one load 6, 6', 6", 6'", 6"" by in each case one further energy cable (not denoted).

This results in the following direct neighbor relationships:

The first connection box 4 has the second connection box 4' as direct neighbor. The second connection box 4' has the first connection box 4 and the third connection box 4" as direct neighbors. The third connection box 4" has the second connection box 4' and the fourth connection box 4'" as direct neighbors. The fourth connection box 4'" has the third connection box 4" and the fifth connection box 4"" as direct neighbors. The fifth connection box 4"" has the fourth connection box 4'" as direct neighbor.

Figure 3A:
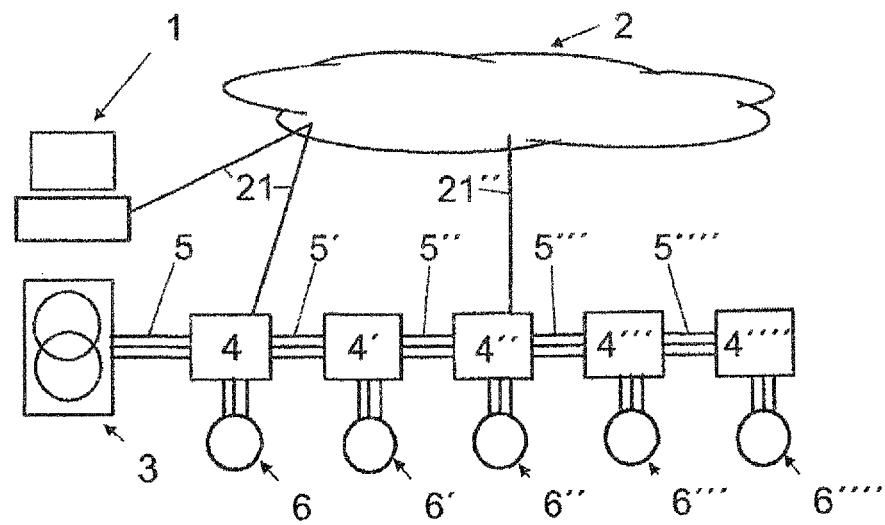
FIG. 3a shows the linear energy grid with a partially connected data network.

FIG. 3a illustrates, in the same way, the linear energy grid, i.e. with the same topology as in the two previous examples, but with a partially connected data network 2. In this case, the connection boxes 4 and 4" are connected to the data network 2 by in each case one data cable 21, 21".

Figure 3B:
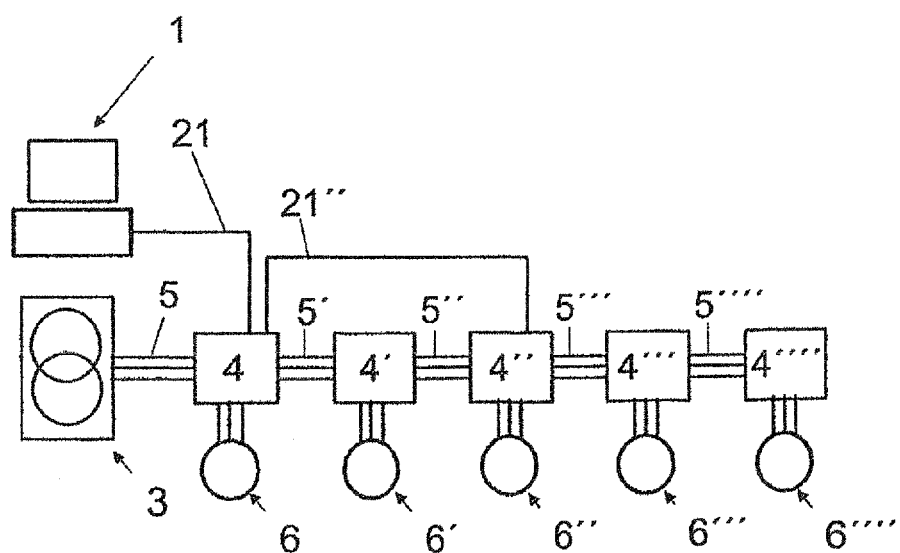
FIG. 3b shows the linear energy grid with wiring of the partially connected data network.

FIG. 3b explicitly illustrates a possible wiring, suitable for this purpose, for the data network. In this case, the first connection box 4 is connected both to the computer unit 1 by the first data cable 21 and to the third connection box 4" by the third data cable 21".

The topology of this energy grid results from the following wiring via the energy cables 5, 5', 5", 5'", 5"":

The first connection box 4 is connected to the external energy supply device 3 via the first energy cable 5. In addition, the first connection box 4 is connected to the second connection box 4' via the second energy cable 5'. The second connection box 4' is connected to the third connection box 4" by the third energy cable 5", which third connection box for its part is connected to the fourth connection box 4'" by the fourth energy cable 5'". The fourth connection box 4'" is finally connected to the fifth connection box 4"" by the fifth energy cable 5"", which fifth connection box is located at the end of the chain and is therefore not connected to another connection box. Each of the connection boxes is additionally connected to in each case one load 6, 6', 6", 6'", 6"" by in each case one further energy cable (not denoted).

This results in the following direct neighbor relationships:

The first connection box 4 has the second connection box 4' as direct neighbor. The second connection box 4' has the first connection box 4 and the third connection box 4" as direct neighbors. The third connection box 4" has the second connection box 4' and the fourth connection box 4'" as direct neighbors. The fourth connection box 4'" has the third connection box 4" and the fifth connection box 4"" as direct neighbors. The fifth connection box 4"" has the fourth connection box 4'" as direct neighbor.

Figure 4:
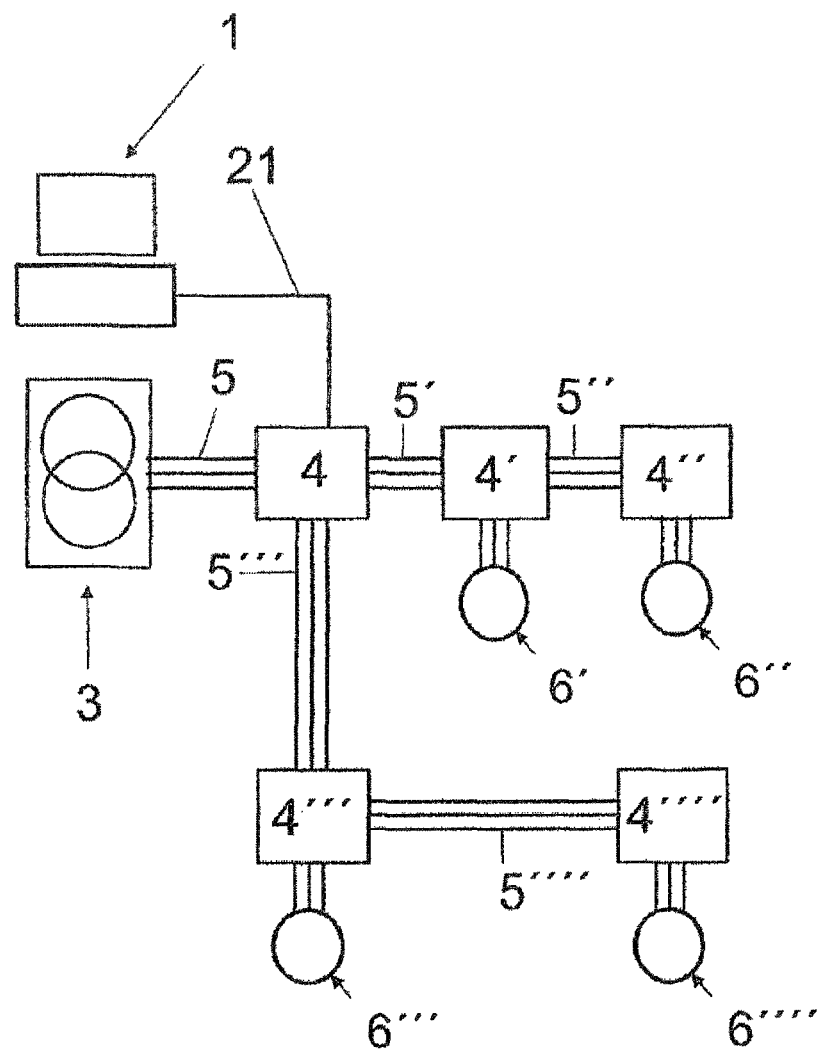
FIG. 4 shows an energy grid with a first tree structure.

FIG. 4 illustrates an energy grid whose topology has a first tree structure.

The topology of this energy grid results from the following wiring via the energy cables 5, 5', 5", 5'", 55"":

The external energy supply device 3 is connected to the first connection box 4 via the first, energy cable 5. The first connection box 4 is connected to the second connection box 4' by the second energy cable 5'. Furthermore, the first connection box 4 is connected to the fourth connection box 4'" by the fourth energy cable 5'". The second connection box 4' is connected to the third connection box 4" by the third energy cable 5". The fourth connection box 4'" is connected to the fifth connection box 4"" by the fifth energy cable 5"".

This results in the following direct neighbor relationships:

The first connection box 4 has the second connection box 4' and the fourth connection box 4'" as direct neighbors. The second connection box 4' has the first connection box 4 and the third connection box 4" as direct neighbors. The fourth connection box 4'" has the first connection box 4 and the fifth connection box 4"" as direct neighbors. The fifth connection box 4"" has the fourth connection box 4'" as direct neighbor.

Therefore, the first connection box 4 is connected in total to two directly adjacent connection boxes 4', 4'" and to the energy supply device 3 and produces a tree structure.

No load is connected to the first connection box 4. In each case one load 6', 6", 6'", 6"" is connected to all of the other connection boxes 4', 4", 4'", 4"" via in each case one energy cable (not denoted).

For reasons of completeness, the computer unit 1 is also illustrated, with this computer unit being connected to the first connection box 4 via a data cable 21.

Figure 5:
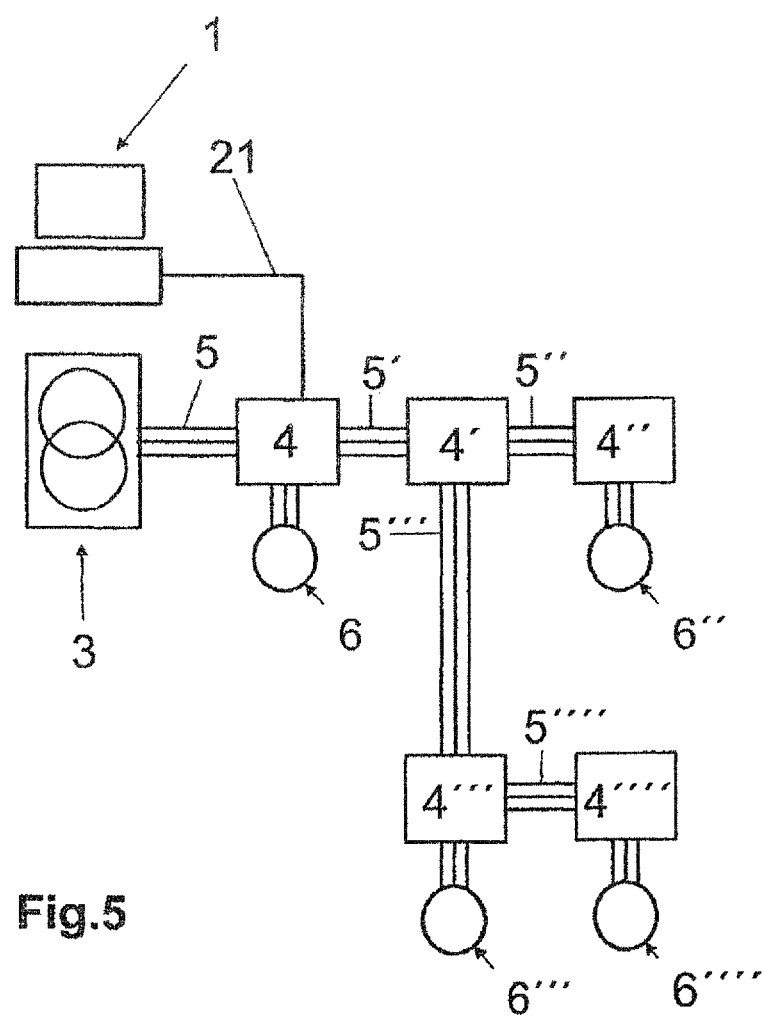
FIG. 5 shows an energy grid with a second tree structure.

FIG. 5 illustrates an energy grid with a second tree structure.

The topology of this energy grid results from the following wiring via the energy cables 5, 5', 5", 5'", 5"":

The external energy supply device 3 is connected to the first connection box 4 via the first energy cable 5. The first connection box 4 is in this case connected to the second connection box 4' by the energy cable 5'. The second connection box 4' is connected to the third connection box 4" by the third energy cable 5". Furthermore, the second connection box is connected to the fourth connection box 4'" by the fourth energy cable 5'". The fourth connection box 4'" is connected to the fifth connection box 4"" by the fifth energy cable 5"". Therefore, the second connection box 4' is connected to in total three directly adjacent connection boxes 4, 4", 4'" and produces a tree structure.

This results in the following direct neighbor relationships:

The first connection box 4 has the second connection box 4' as direct neighbor. The second connection box 4' has the first connection box 4, the fourth connection box 4'" and the third connection box 4" as direct neighbors. The third connection box 4" has the second connection box 4' as direct neighbor. The fourth connection box 4'" has the second connection box 4' and the fifth connection box 4"" as direct neighbors. The fifth connection box 4"" has the fourth connection box 4"" as direct neighbor.

No load is connected to the second connection box 4'. In each case one load 6, 6", 6'", 6"" is connected to all of the other connection boxes 4, 4", 4'", 4"" via in each case one energy cable (not denoted).

For reasons of completeness, the computer unit 1 is also illustrated, with the computer unit being connected to the first connection box 4 via a data cable 21.

Figure 6:
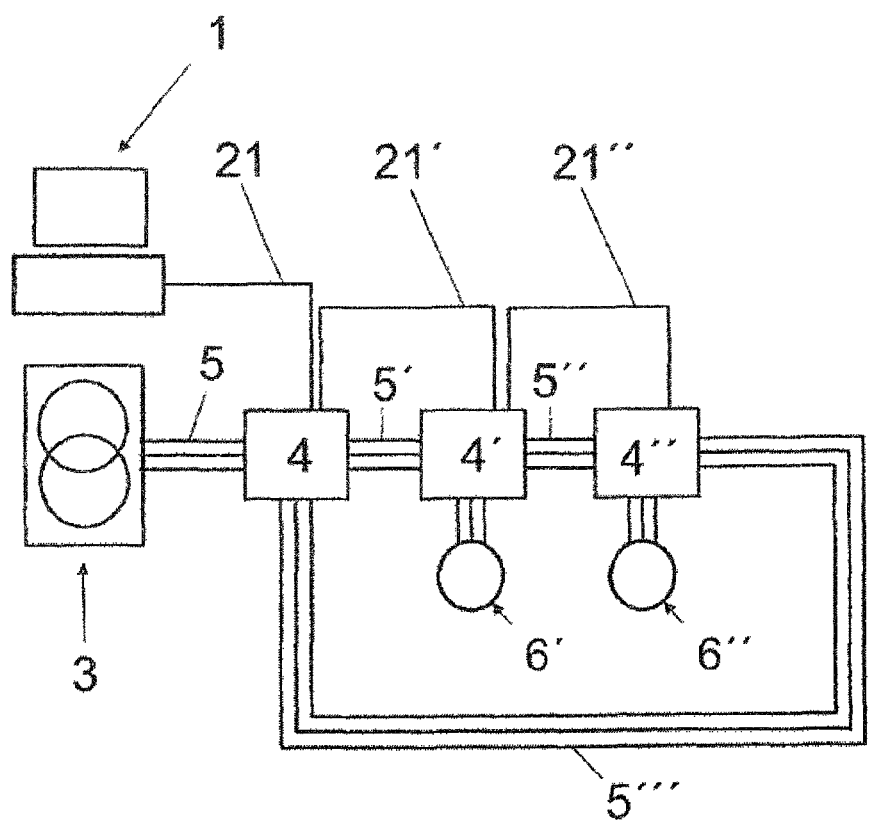
FIG. 6 shows an energy grid with a ring structure.

FIG. 6 illustrates an energy grid with a ring structure.

The topology of this energy grid results from the following wiring via the energy cables 5, 5', 5", 5'", 5"":

The external energy supply device 3 is connected to the first connection box 4 via the first energy cable 5. The first connection box 4 is connected to a second connection box 4' by a second energy cable 5'. The second connection box 4' is connected to a third connection box 4" via a third energy cable 5". The third connection box is connected in turn to the first connection box 4 via a fourth energy cable 5'". The resultant ring can be extended as desired by adding further connection boxes.

This results in the following direct neighbor relationships: The first connection box 4 has the second connection box 4' and the third connection box 4" as direct neighbors. The second connection box 4' has the first connection box 4 and the third connection box 4" as direct neighbors. The third connection box 4" has the second connection box 4' and the first connection box 4 as direct neighbors.

For reasons of completeness, the computer unit 1 is also illustrated, with the computer unit being connected to the first connection box 4 via a data cable 21. The first connection box 4 is connected to the second connection box 4' via a second data cable 21'. The second connection box 4' is connected to the third connection box 4" via a third data cable 21".

Furthermore, meshed grids are also possible, in which a combination of tree, ring and linear structures can be implemented.

Figure 7:
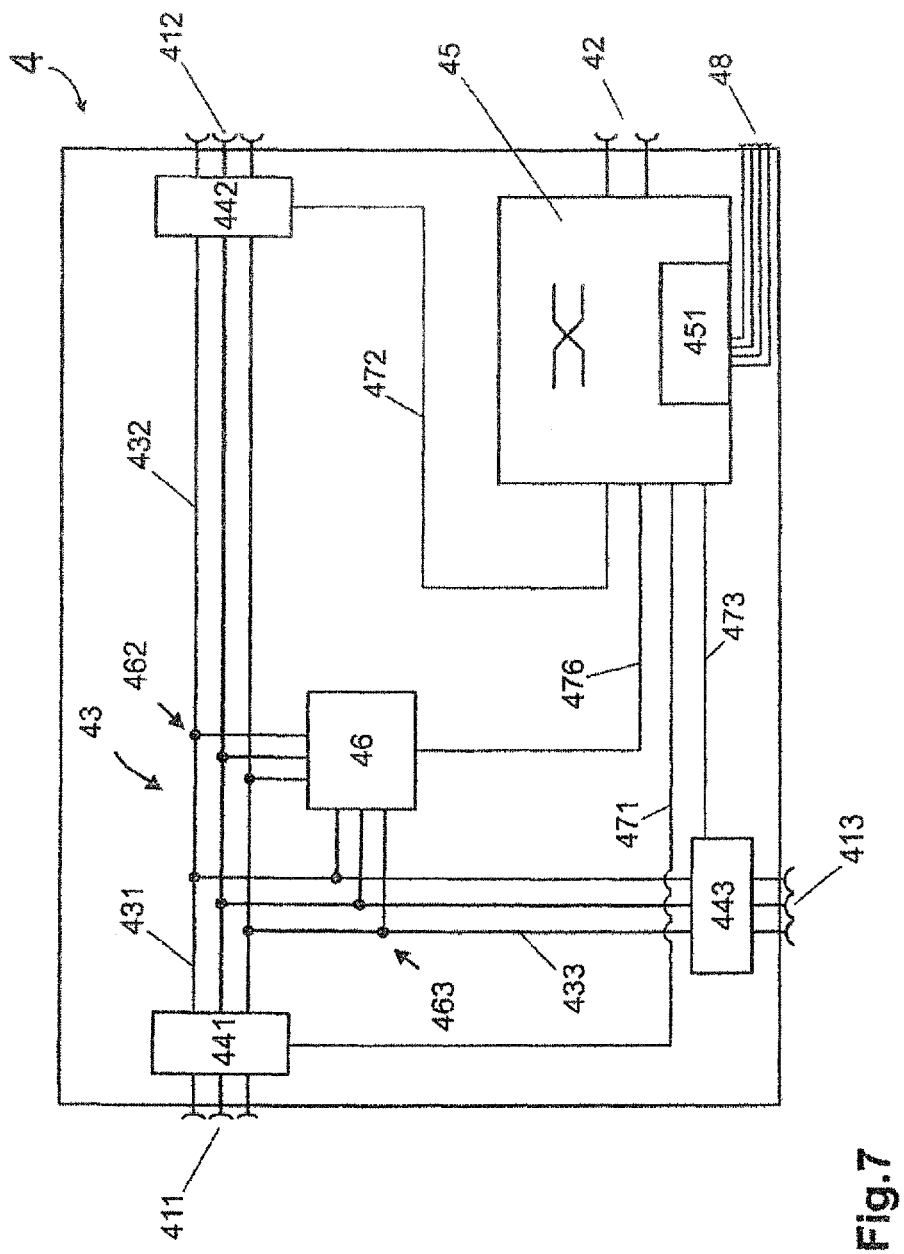
FIG. 7 shows a block circuit diagram of a connection box.

FIG. 7 illustrates a block circuit diagram of a connection box 4 according to the invention by way of example for all connection boxes 4, 4', 4", 4'", 4"". For reasons of clarity, the reference symbols of the first connection box 4 are therefore also used for the other boxes 4', 4", 4'", 4"".

The connection box 4 therefore has a first energy connection 411, a second energy connection 412 and a third energy connection 413, which are each provided for connecting energy cables 5, 5', 5", 5'", 5"". The energy connections 411, 412, 413 are conductively connected to one another via an internal energy line 43. The energy line 43 has three branches 431, 432, 433, which are connected to the energy connections 411, 412, 413 via in each case one modulation/demodulation device 441, 442, 443.

The connection box has in each case one measurement point 462, 463 at two energy branches 432, 433. In the present exemplary embodiment, the energy cables 5, 5', 5", 5'", 5"" are three-phase cables, the energy connections 411, 412, 413 are three-phase connections, and the energy line 43 is a three-phase line, with the result that each measurement point 462, 463 has three subordinate measurement points, namely one for each phase of the energy line 43. These subordinate measurement points are not denoted in the drawing.

A measurement means assembly 46 is connected to these two measurement points 462, 463, i.e. to the subordinate measurement points thereof.

Correspondingly, the modulation/demodulation devices 441, 442, 443 also need to be connected to only one or two of the three phases of the respective energy connections 411, 412, 413. In the present case, the modulation/demodulation devices 441, 442, 443 are connected to two phases of the energy connections 411, 412, 413 and thus ensure symmetrical data transmission. The third phase of the respective energy connection 411, 412, 413 is passed mechanically through the respective modulation/demodulation device 441, 442, 443 without any electrical connection to said respective modulation/demodulation device 441, 442, 443 and is connected directly to the corresponding third phase of the energy line 43.

Furthermore, the connection box 4 has a data network switch 45 with two external box data network connections 42, which are provided for connection of data cables 21, 21', 21", 21'", 21"".

The data network switch 45 is connected to the three modulation/demodulation devices 441, 442, 443 and to the measurement means assembly 46 via a data bus with four data bus lines 471, 472, 473, 476, with this preferably being an I2C bus.

Furthermore, the connection box 4 has a low-voltage switched-mode power supply, preferably a 24 V switched-mode power supply, which is not illustrated in the drawing for reasons of clarity. By means of this low-voltage switched-mode power supply, internal components of the connection box 4, in particular the measurement means assembly 46, the data network switch 45 and the modulation/demodulation devices 441, 442, 443, can be supplied with electrical energy required for their operation.

On the box side, the modulation/demodulation devices 441, 442, 443 each have at least one electrical filter, preferably a low-pass filter, in particular in each case one low-pass filter per connected phase. This filter is particularly preferably a series-connected inductance, which is preferably connected to ground on the box side via a capacitance. Data transmission on the energy line 43 is prevented by the electrical filter. For example, no data transmission can take place via the energy line 43 from the first energy connection 411 to the second energy connection 412 of the first connection box 4. If, however, data transmission is desired from, for example, the first energy connection 411 to the second energy connection 412, the data network switch 45 can transmit the corresponding data from the first modulation/demodulation device 411 to the second modulation/demodulation device 442, with the result that said data can be modulated onto energy connection 412 connected thereto again and from there transmitted on via an energy cable 5', for example to the second connection box 4' which may be connected thereto.

As an alternative to this, a data cable 21' can be connected to one of the box data network connections 42. The data can then be transmitted to the second connection box 4' which may be connected thereto via this data cable 21'.

If it should be desirable, for example, for the fifth connection box 4"" to transmit data to the computer unit 1 in the energy grid illustrated in FIG. 3b, for example, these data would be transmitted first via the fifth energy cable 5"" to the fourth connection box 4'" and from there via the fourth energy cable 5'" to the third connection box 4" since the fourth and fifth connection boxes 4"" and 4'" are not connected to the data network 2. From the third connection box 4", the data are transmitted via the third data cable 21" to the first connection box 4 and from there via the first data cable 21 to the computer unit 1.

In this case, the data network switch 45 of each participating connection box 4, 4", 4'", 4"" searches for the respectively most favorable transmission path in accordance with its protocol. The data transmission via the box data network connections 42 in this case has priority over data transmission via the energy connections 411, 412, 413.

Figure 8:
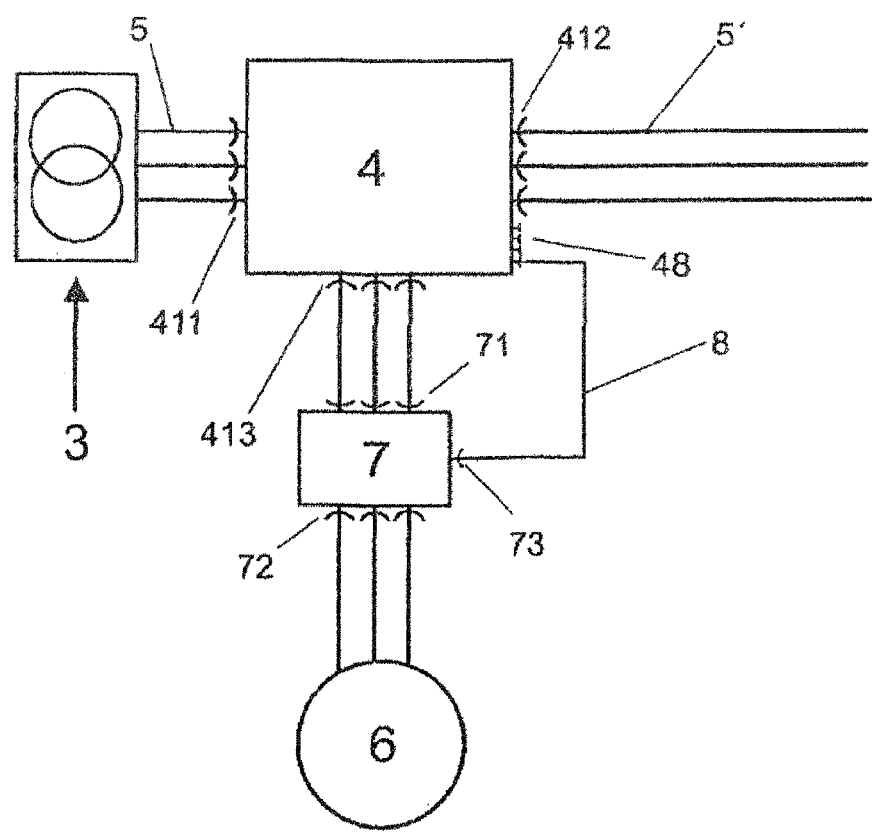
FIG. 8 shows a connection box with a load connected via an external switching device.

Furthermore, the data network switch 45 has a switching connection assembly 451 with a plurality of external switching connections 48 for driving and/or interrogating in each case one electrically actuable switching device 7, illustrated in FIG. 8.

FIG. 8 illustrates a connection box 4 with a load 6 connected via the electrically actuable switching device 7. The connection box 4 is connected to an energy cable 5 via its first energy connection 411. The connection box 4 receives electrical energy from the external energy supply device 3 via this energy cable 5.

The connection box 4 is connected to a second energy cable 5' by its second energy connection 412.

The connection box 4 is connected to a first electrical connection 71 of the electrically actuable switching device 7 via an energy cable (not denoted) by its third energy connection 413. This electrically actuable switching device 7 is connected to the electrical load 6 by a second electrical connection 72 via a further energy cable (not denoted). In addition, one of the switching connections 48 of the first connection box 4 is connected via a switching line 8 to a control connection 73 of the electrically actuable switching device 7.

On reception of a corresponding control signal at its control input 73, the electrical switching device 7 connects its first electrical connection 71 electrically conductively to its second electrical connection 72.

Thus, the computer unit 1 can also connect and disconnect the power supply to one or more loads 6, 6', 6", 6'", 6"" via the respective connection box 4, 4', 4", 4'", 4"". The loads 6, 6', 6", 6'", 6"" can of course be connected via such switching devices 7 to the respective connection boxes 4, 4', 4", 4'", 4"" via in each case one such switching device 7 and can therefore be connected and disconnected both in the energy distributions illustrated in FIGS. 1 to 6 and in all other possible topologies. Such a switching device 7 can also be arranged in entire branches of the energy grid and is thus capable of connecting and disconnecting entire network segments and/or changing the topology.

Figure 9:
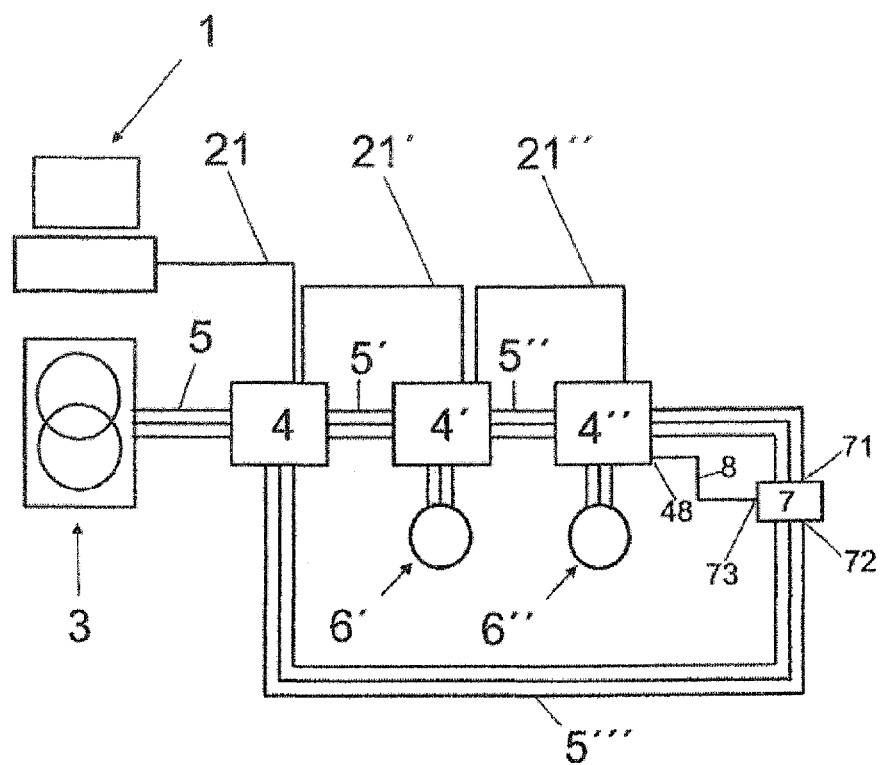
FIG. 9 shows an energy grid with a switchable ring structure.

Correspondingly, FIG. 9 illustrates a switchable ring structure, following on from the energy grid illustrated in FIG. 6. The third connection box 4" is in this case connected to a first electrical connection 71 of the switching device 7 via an energy cable (not denoted). The second electrical connection 72 of the switching device 7 is connected to an energy connection of the first connection box 4 via the fourth energy cable 5'". In the normal state, the two electrical connections 71, 72 of the connection box 7 can be electrically isolated from one another. If required, the connection box 4, at the request of the computer unit 1, emits a signal via one of its switching connections 48 for instructing the switching device 7 connected thereto to electrically conductively connect its electrical connections 71, 72 to one another and therefore in order to ensure an additional energy connection between the third connection box 4" and the first connection box 4.

Figure 10:
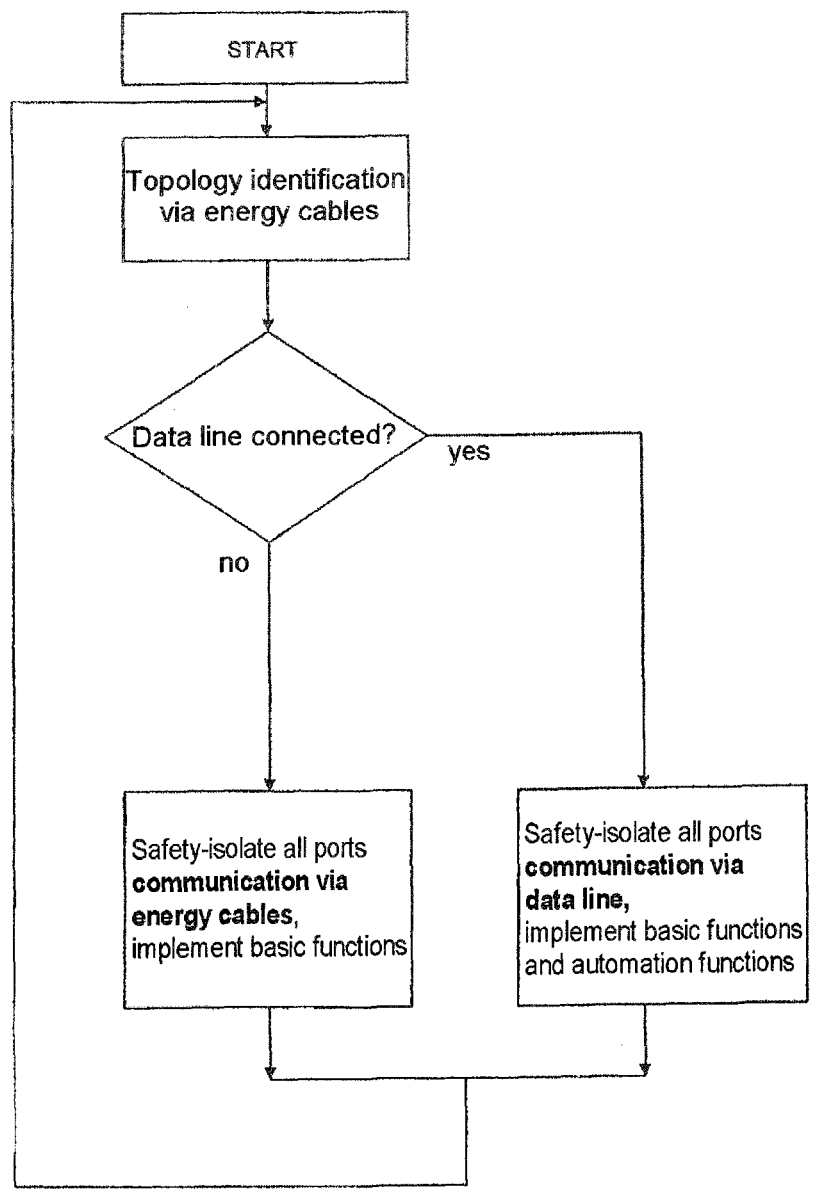
FIG. 10 shows a flowchart illustrating a method for operating the energy grid.

FIG. 10 illustrates a flowchart for a method for operating an energy grid. First, topology identification takes place via the energy cables 5, 5', 5", 5'", 5"". This is based on direct neighbor identification, which will be explained below using an example:

In FIG. 4, for example, the first connection box 4 receives, from the connection boxes 4', 4'" directly adjacent thereto, the identification of said connection boxes, for example their IP address and/or the MAC address of the data network switch 45 thereof of any other internal identification, via the corresponding energy cables 5'", 5'. Thereupon, these identifications can be transmitted together with the dedicated identification of the connection box 4 to the computer unit 1 in this case via the data cable 21.

In the same way, the connection boxes 4', 4", 4'", 4"" also collect the identifications of their respective direct neighbors and transmit these together with their respective dedicated identification via the energy cables 5', 5", 5'", 5"" and via the first data cable 21 to the computer unit 1 in the above-described way.

These data are collected and evaluated in the computer unit 1. As a result, the topology of the energy grid can be imaged and stored. This topology identification can be repeated regularly, i.e. at regular time intervals, for example at time intervals of less than seconds, in particular less than 5 seconds, particularly preferably 3 seconds. After each repetition, a comparison of the newly determined topology with the stored topology takes place. If a change is established, an alarm can be triggered as a result, for example.

In particular, this is of great importance for the ring structure illustrated in FIG. 6. If a fault occurs within the ring structure which consists, for example, in that one of the energy cables 5', 5", 5'" is missing or does not have any electrical contact, the energy flow is maintained via an alternative path. However, owing to the repetition of the topology identification, this fault is identified immediately and can be eliminated correspondingly before it has any effects on the power supply to individual loads 6', 6".

The measurement means assembly 46 of each connection box 4, 4', 4", 4'", 4"" can measure values of electrical variables such as current and voltage, for example, in two branches 432, 433 of the energy line 43 and calculate the corresponding values in the remaining branch 431, which does not have a measurement point using an arithmetic logic unit. With the aid of the arithmetic logic unit, then in each case the rms values of the current and voltage and the active power are determined in all three phases of the three branches 431, 432, 433 and transmitted to the computer unit 1 at the request of the computer unit 1. By virtue of the determination and transmission of only the rms values of the current and voltage and the active power, transmission capacity is saved in comparison with complete transmission of all measured values. This procedure can be repeated regularly, i.e. at regular time intervals, for example at time intervals of less than 10 seconds, in particular less than 5 seconds, particularly preferably 3 seconds.

In accordance with the flowchart illustrated in FIG. 10, topology identification is implemented at regular intervals. After each topology identification, it is established by each connection box 4, 4', 4", 4''', 4'''' whether one of its box data network connections 42 is connected to the data network 2.

Correspondingly, the computer unit 1 can determine which of the connection boxes 4, 4', 4", 4''', 4'''' are connected to the data network 2.

Correspondingly, in addition, the data network switch 45 of such a connection box 4 can decide, in accordance with its protocol, whether only basic functions or additionally also automation functions are implemented and whether the respective data are transmitted via a box data network connection 42 and a data cable 21, 21', 21", 21''', 21'''' connected thereto or via the corresponding energy connection 411, 412, 413 and an energy cable 5, 5', 5", 5''', 5'''' connected thereto.

By evaluating and storing the values of relevant electrical variables in a database of the computer unit 1, graphical and statistical evaluations can also take place which give an indication of the total energy consumption and the individual energy consumption at each connection box.

Thus specific loads 6, 6', 6", 6''', 6'''' to be established, for example superfluous loads, can also be disconnected depending on the total energy consumption.

The invention is not restricted to the exemplary embodiment, but is multiply variable in the context of the disclosure. The above-described, energy grid is, for example, by way of example, a three-phase grid; the disclosed embodiments can be transferred to other energy grids such as DC and AC grids, however. The described embodiments can also be transferred to any desired topologies, in particular topologies which are substantially more extensive than those shown. In particular, the application is not restricted to the administration by a central computer unit 1. Instead, the connection boxes 4, 4', 4", 4''', 4'''' can also be autonomously self-administrating, for example by virtue of the first connection box 4 wholly or partially taking on the described characteristics and the described functions of the computer unit 1.

LIST OF REFERENCE SYMBOLS FEB. 15, 2012

Administratable Energy Grid with Data Transmission Function

File Ref.: P210-30 WO P H
1 Computer unit
2 Data network
21, 21', 21", . . . Data cables
3 External energy supply device
4,4',4", . . . Connection boxes
411, 412, 413 Electrical energy connections
42 Box data network connections
43 Energy line
431, 432, 433 Different branches of energy line
441, 442, 443 Modulation/demodulation devices
45 Data network switch
451 Switching connection assembly
46 Measurement means assembly
462, 463 Measurement points
471, 472, 473, 476 Data bus lines
48 External switching connections
5,5', 5", . . . Energy cables
6, 6', 6", . . . Loads
7 Switching device
71, 72 Electrical connections of switching device
73 Control connection of switching device
8 Switching line

The invention claimed is:

1. A method for operating an energy grid with a computer unit and a plurality of connection boxes, wherein, in each connection box, a branching internal energy line electrically conductively connects at least three energy connections of each connection box to one another,
wherein the method comprises topology identification, which has the following steps:
sequential interrogation of the connection boxes by the computer unit by associated software via an associated computer data network connection and via at least one box data network connection of at least one first connection box and via one or more box data network connections and/or one or more energy connections of the connection boxes;
implementation of direct neighbor identification between each connection box and at least one connection box directly adjacent thereto, wherein such mutually directly adjacent connection boxes are characterized in that they are connected to one another with in each case one of their energy connections via an energy cable, wherein an associated identification is transmitted at least from one of two directly adjacent connection boxes via an energy cable to the respective other of two directly adjacent connection boxes, wherein electrical filters in the connection boxes ensure that the data used for the identification are interchanged exclusively between adjacent connection boxes;
transmission of the direct neighbor relationships of the respective connection boxes to the computer unit;
imaging of the topology of the energy network corresponding to the transmitted direct neighbor relationships by the computer unit by the software.

2. The method according to claim 1, wherein said transmission of the direct neighbor relationships from the respective connection boxes to the computer unit takes place in the following way:
collection of the identification of their respective direct neighbors by the individual connection boxes;
transmission of this identification of the direct neighbors together with their own identification from the connection boxes to the computer unit, wherein
this transmission of the identifications of the further connection boxes to the first connection box takes place via one or more of the box data network connections and/or via one or more of the energy connections, and wherein the transmission of the identifications furthermore takes place from the first connection box to the computer unit via the box data network connection of the first connection box and the computer data network connection.

3. The method according to claim 1, wherein the energy line connects the energy connections to one another via electrical filters.

4. The method according to claim 3, wherein the energy line connects the energy connections to one another via inductances of the electrical filters.

5. The method according to claim 1, wherein the sequential interrogation of the connection boxes by the computer unit and the transmission of the identifications from the connection boxes to the computer unit take place in the form of data transmission by a data network switch.

6. The method according to claim 5, wherein the data transmission is modulated in the event of a transmission via an energy connection in advance with an associated modulation/demodulation device.

7. The method according to claim 1, wherein the reproduced topology of the energy grid is stored in the computer unit;
   the topology is newly reproduced at regular time intervals;
   each newly reproduced topology is compared with the stored topology;
   in the event of discrepancies between the stored topology and the newly determined topology, a warning indicator is generated by the computer unit.

8. The method according to claim 7, wherein
   after each topology identification, each connection box checks its connection to the data network, whereupon
   either, when the data network is not connected, the data to be transmitted so as to maintain basic functions of the energy grid are transmitted via the respective energy connections and the corresponding energy cables;
   or, when the data network is connected, the data to be transmitted in order to maintain basic functions of the energy grid are preferably transmitted via the data network.

9. The method according to claim 8, characterized in that the topology identification counts as one of the basic functions of the energy grid.

10. The method according to claim 8, characterized in that determination and transmission of the values of electrical variables such as current, voltage and power from individual connection boxes to the computer unit take place and count as basic functions of the energy grid.

11. The method according to claim 10, characterized
   in that each connection box in the computer unit is denoted uniquely by a name;
   in that the computer unit assigns the MAC address of the associated data network switch to the name of each connection box and stores this;
   in that the computer unit assigns the values of electrical variables of each connection box to the name of this connection box and stores these.

12. The method according to claim 2, wherein the energy line connects the energy connections to one another via electrical filters.

13. The method according to claim 12, wherein the energy line connects the energy connections to one another via inductances of the electrical filters.

14. The method according to claim 2, wherein the sequential interrogation of the connection boxes by the computer unit and the transmission of the identifications from the connection boxes to the computer unit take place in the form of data transmission by a data network switch.

15. The method according to claim 14, wherein the data transmission is modulated in the event of a transmission via an energy connection in advance with an associated modulation/demodulation device.

16. The method according to claim 3, wherein the sequential interrogation of the connection boxes by the computer unit and the transmission of the identifications from the connection boxes to the computer unit take place in the form of data transmission by a data network switch.

17. The method according to claim 16, wherein the data transmission is modulated in the event of a transmission via an energy connection in advance with an associated modulation/demodulation device.

18. The method according to claim 9, characterized in that determination and transmission of the values of electrical variables such as current, voltage and power from individual connection boxes to the computer unit take place and count as basic functions of the energy grid.

19. The method according to claim 18, characterized
   in that each connection box in the computer unit is denoted uniquely by a name;
   in that the computer unit assigns the MAC address of the associated data network switch to the name of each connection box and stores this;
   in that the computer unit assigns the values of electrical variables of each connection box to the name of this connection box and stores these.

* * * * *